Aug. 15, 1950     G. B. MYERS     2,518,563

FILM VIEWING FRAME

Filed Feb. 17, 1947

INVENTOR
GEORGE B. MYERS

BY

ATTORNEYS

Patented Aug. 15, 1950

2,518,563

UNITED STATES PATENT OFFICE 2,518,563

FILM VIEWING FRAME

George B. Myers, Teaneck, N. J., assignor to Picker X-Ray Corporation, New York, N. Y., a corporation of New York Application February 17, 1947, Serial No. 729,082

1 Claim. (Cl. 40—130)

This invention relates to improvements in a film viewing frame and for a clip associated therewith.

An object of the present invention is to provide a frame for viewing X-ray films or the like either when dry or wet.

Another object of the invention is to provide a novel clip adapted to hold a film in a viewing frame and so constructed that the pressure of the clip on the film may be nicely regulated.

Another object of the invention is to provide a spring clip for the purpose described which is comprised of few parts which may be very cheaply assembled.

Other objects and advantages of the invention will be apparent from the accompanying drawings and description, and the essential features will be set forth in the appended claim.

In the drawings,

Fig. 2 is a central sectional view of a modified form of the clip of Fig. 1; while Fig. 3 is a front elevational view of my viewing frame with a plurality of my improved clips in position.

In viewing X-ray films, it is customary to support them in front of a sheet of opal glass or the like behind which suitable illumination is provided. One of the requirements of such a device is that the film may be expeditiously supported in position for viewing with the least amount of handling and with no marring of the film if the same can be prevented.

Figure 1:
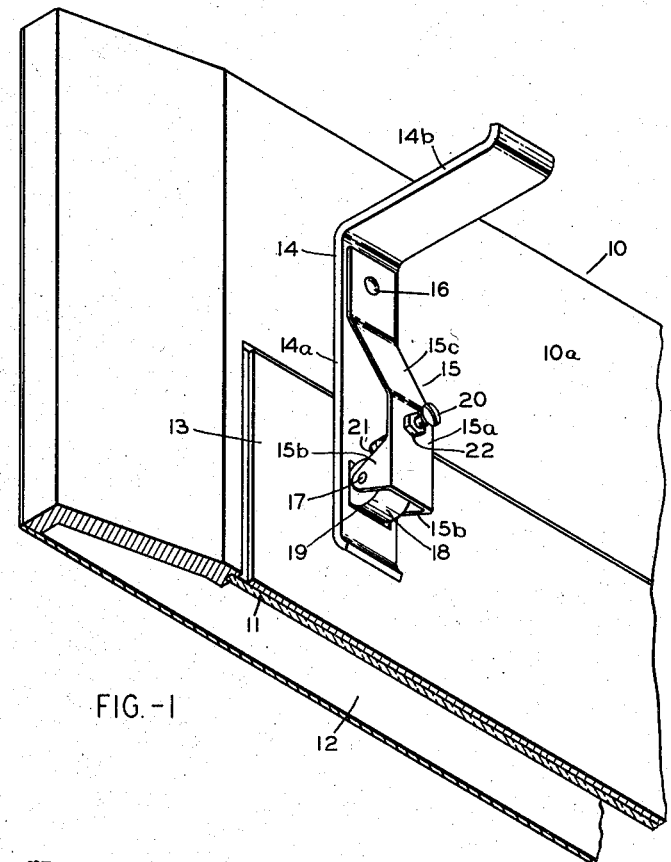
Fig. 1 is a perspective view of the upper lefthand corner of my improved frame showing one of my improved clips in position for holding a film.

One manner of carrying out my invention is illustrated in Fig. 1 where a hollow frame 10 is provided having a border portion 10a surrounding the opal glass 11 behind which proper illumination is provided in the space 12. The illuminating devices are not shown, as they form no part of the present invention. It is desired to support a radiographic film 13 against the glass for viewing purposes. In Fig. 1, I have shown an L shape hanger 14 having one leg 14a fixed to the frame 10 and having the other leg 14b extending outwardly from the frame in position to support a wet film hanger. The free end of the leg 14a may extend over the face of the film 13 as shown in Fig. 1. A leaf spring 15 of spring bronze or the like is rigidly fixed to the frame and to the hanger 14 as by means of the rivet 16 or by welding or brazing. The free end of the spring 15a extends over the edge of the film spaced from the hanger leg 14a. Two ears 15b are formed of the metal of the spring and turned downwardly to provide supports for a shaft 17 by means of which a roller 18 is rotatably mounted. Preferably, this roller is of plastic or other material which will not easily corrode in the presence of chemicals and which will not easily mar the film 13. An opening 19 is provided through the leg 14a in registration with the roller 18 so as to permit the roller to bear against the film 13. It will be understood that the rigid fastening of the leaf spring at its upper end and the arrangement of the offset portion thereof 15c is such that the roller 18 is resiliently urged toward the film 13.

In order to nicely adjust the pressure of the roller on the film and in order to prevent damage to the film a stop screw 20 is provided which has threaded engagement with the leaf spring and engages the hanger 14 at the point 21. If necessary or desirable, a locknut 22 may be provided on the stop screw. By adjusting this screw, the pressure of the roller 18 on the film 13 is arranged just sufficient to hold the film in place, but not sufficient to mar the photographic surface of the film.

Figures 2, 3:
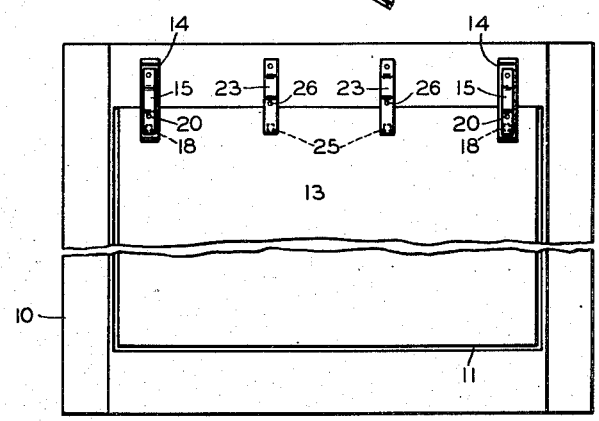

In Fig. 2, I have shown a modified form of my device wherein the frame border 10a, the opal glass 11 and the film 13 are the same as before. Here, the leaf spring 23 is rigidly secured to the frame by means of the rivet 24 or other suitable fastening. Preferably a rigid plate 27 is secured to the frame by the rivet 24 also. The free end of the leaf spring extends over the edge of the film and is provided with downturned ears 23a in which the roller 25 is rotatably mounted. A stop screw 26 has threaded engagement with the leaf spring and abuts against the plate 27 at the point 28 or this point might be lower down like point 21 of Fig. 1. In other words, the leg 14a of Fig. 1 might be cut off along the upper edge of opening 19. A locknut 29 may be provided if desired. Here again, the pressure of the roller 25 on the film 13 is nicely adjusted by means of the screw 26.

Referring to Fig. 3, I have shown the frame 10 in front elevation with four spring clips arranged across the top for holding the film 13. The two holding devices at the edges of the film are provided with hangers 14 as shown in Fig. 1 for the purpose of supporting a wet film hanger. These carry leaf springs 15 like those already described which have rollers 18 bearing against the film. The intermediate clips are like those shown and described in connection with Fig. 2 and carry rollers 25 which bear against the film. By adjustment of the screws 20 and 26 even pressure of all the rollers against the film may be provided so that when the film 13 is moved upwardly in the frame against the glass 11, it will not buckle because of excessive or uneven pressure of the rollers 18 and 25 against the face of the film. Instead, the film will slide easily into position with all of the rollers bearing sufficiently against the film to hold it in place but insufficiently to mar or damage the film.

Another need for the adjustment of roller pressure by means of screws 20 and 26 arises from the inequalities encountered in the opal glass 11. Often this glass varies in thickness to an appreciable degree. By the means shown, the approach of rollers 18 and 25 toward the holding frame may be varied to compensate for this variation in glass thickness so that the pressure of the rollers against the film is equal in all cases.

What I claim is:

A pressure clip for holding a film on a viewing frame comprising a leaf spring having one end rigidly secured to said frame and having a free end extending over the edge of a film in said frame, said free end being spaced from said film and yieldingly urged theretoward, a roller rotatably mounted in the free end of said spring, and a stop screw threaded through said free end of said spring, the end of said screw abutting a part rigid with said frame, whereby to nicely adjust the pressure of said roller on said film.

GEORGE B. MYERS.

REFERENCES CITED

The following references are of record in the file of this patent:

UNITED STATES PATENTS

| Number | Name | Date |
|---|---|---|
| 1,703,952 | Prince | Mar. 5, 1929 |
| 1,989,803 | Hoben | Feb. 5, 1935 |
| 2,056,878 | Wineholt | Oct. 6, 1936 |